United States Patent [19]

Nagel et al.

[11] Patent Number: 5,678,001
[45] Date of Patent: Oct. 14, 1997

[54] COMPUTERIZED GAME TEACHING METHOD

[76] Inventors: Ralph Nagel; Roger Roberts, both of 2532 Durant Ave., Suite 104, Berkeley, Calif. 94704

[21] Appl. No.: 628,521

[22] Filed: Apr. 5, 1996

Related U.S. Application Data

[63] Continuation of Ser. No. 101,929, Aug. 4, 1993, abandoned.
[51] Int. Cl.⁶ .............................. G06F 15/00; A63F 3/00; G09B 19/00
[52] U.S. Cl. ...................... 395/173; 273/237; 434/118; 434/128
[58] Field of Search ............................. 395/173, 352, 395/348; 273/237, 238, 260, 430; 434/118, 128, 307, 323

[56] References Cited

U.S. PATENT DOCUMENTS

| | | | |
|---|---|---|---|
| 3,628,259 | 12/1971 | Kahn | 35/9 E |
| 4,052,073 | 10/1977 | Miller | 273/148 R |
| 4,073,067 | 2/1978 | Beach | 273/237 |
| 4,279,421 | 7/1981 | Tepoorten et al. | 273/237 |
| 4,398,720 | 8/1983 | Jones et al. | 364/410 |

OTHER PUBLICATIONS

Bill Green; "Pring A Computer–VS–Yon Chess Game"; Dec. 1978; Popular Electronics; pp. 49–51, 56–58.

"Brilliant Bridge"; Scientific Amer.; Feb. 1980, p. 115.

*Primary Examiner*—Jack B. Harvey
*Assistant Examiner*—Xuong Chung-Trans
*Attorney, Agent, or Firm*—H. Michael Brucker

[57] ABSTRACT

A computer readable memory operable with a computer having a display screen to cause the computer to store problems and solutions and permit various different kinds of hints and suggestions to be accessed during the solution of the problems.

34 Claims, 7 Drawing Sheets

COMPUTERIZED GAME TEACHING METHOD

This application is a continuation of application Ser. No. 08/101,929 filed on Aug. 4, 1993, now abandoned.

BACKGROUND OF THE INVENTION

The present invention relates to a computerized device useful in teaching problem solving, and more particularly to a computer readable memory operable with a computer to cause the computer to operate according to the invention. The problems to which the invention relates are those that can be manifest by problem representations on a computer screen and are solved by making a series of sequential steps (solution set) leading to a solution. The invention is particularly applicable to those kind of game problems that can be displayed on a screen by game equipment representations and are solved by a series of rearrangements of the game representations.

The present invention will be discussed and described in connection with the game of chess although it will be evident from what follows that the invention is applicable to any game or problem that includes sequentially manipulated problem representations, such as Checkers, Bridge, Backgammon, Go, etc.

While there are presently available numerous computerized game simulations, including chess, they are for the most part of the type where the computer takes the part of one of the opponents in the game and the game is played to finality to determine a winner.

In the present invention the object is not to simulate a game opponent for the purpose of determining a winner, but rather to simulate a teacher or mentor who offers a variety of different kinds of hints and suggestions as a problem is presented and at every step towards its solution.

SUMMARY OF THE INVENTION

In the present invention, all or a portion of a chessboard is simulated on a portion of a computer screen and a number of simulated chess pieces appear at various locations on the chessboard so as to establish a problem to be solved by one or more steps comprising one or more moves of one or more of the pieces appearing on the screen. In order for the player to know immediately whether or not a given selected step (move of a chess piece) is the correct step predetermined for the solution of the problem, only the predetermined step will be acknowledged by the computer.

In addition to, and in combination with, the simulated chessboard and chess pieces, the player is able to prompt the computer to select one of several different hints for solving the problem. Each of the several hints available to the player can be weighted to reflect the amount of information toward the solution of the problem that the hint contains.

Typically, in the course of solving the problem, the player may make one or more incorrect steps and may use one or more of the available hints. Depending on the number of incorrect steps and/or the number of hints utilized in order to solve the problem, a score is determined and ascribed to the solution of the problem. One of the features of the present invention is that the particular problem presented to the player can be dependent upon the score achieved in one or more previously presented problems to the same player. In this way, the more problems that a player solves, the more the computer knows about the player and the more the computer can select the best problem to be presented to the player.

It is an object of the present invention to provide a computerized device for teaching problem solving where the problem is presented on a computer screen in the form of problem representations which can be rearranged a number of times to simulate a sequential step by step solution to the problem and where different kinds of hints and suggestions are selectively available to assist in achieving the solution.

It is another object of the present invention to provide a computerized teaching device for games of the type that include game equipment and the play of which includes sequential movement of that equipment, wherein all or a portion of the game equipment is simulated on a computer screen to present a problem to be solved by one or more sequential moves of the equipment, wherein the computer only recognizes the sequential steps predetermined for the solution of the problem, and wherein a plurality of hints for solving the problem are selectively revealed to the player at the player's option.

Another object is to include the further feature of establishing a score for the solution of a problem based on the number of incorrect moves and/or the hints utilized in the course of solving the problem and/or the time required to solve the problem, and utilizing the score achieved in one or more previous problems to select the next problem to be presented to the player.

DESCRIPTION OF PREFERRED EMBODIMENTS

Figure 1:
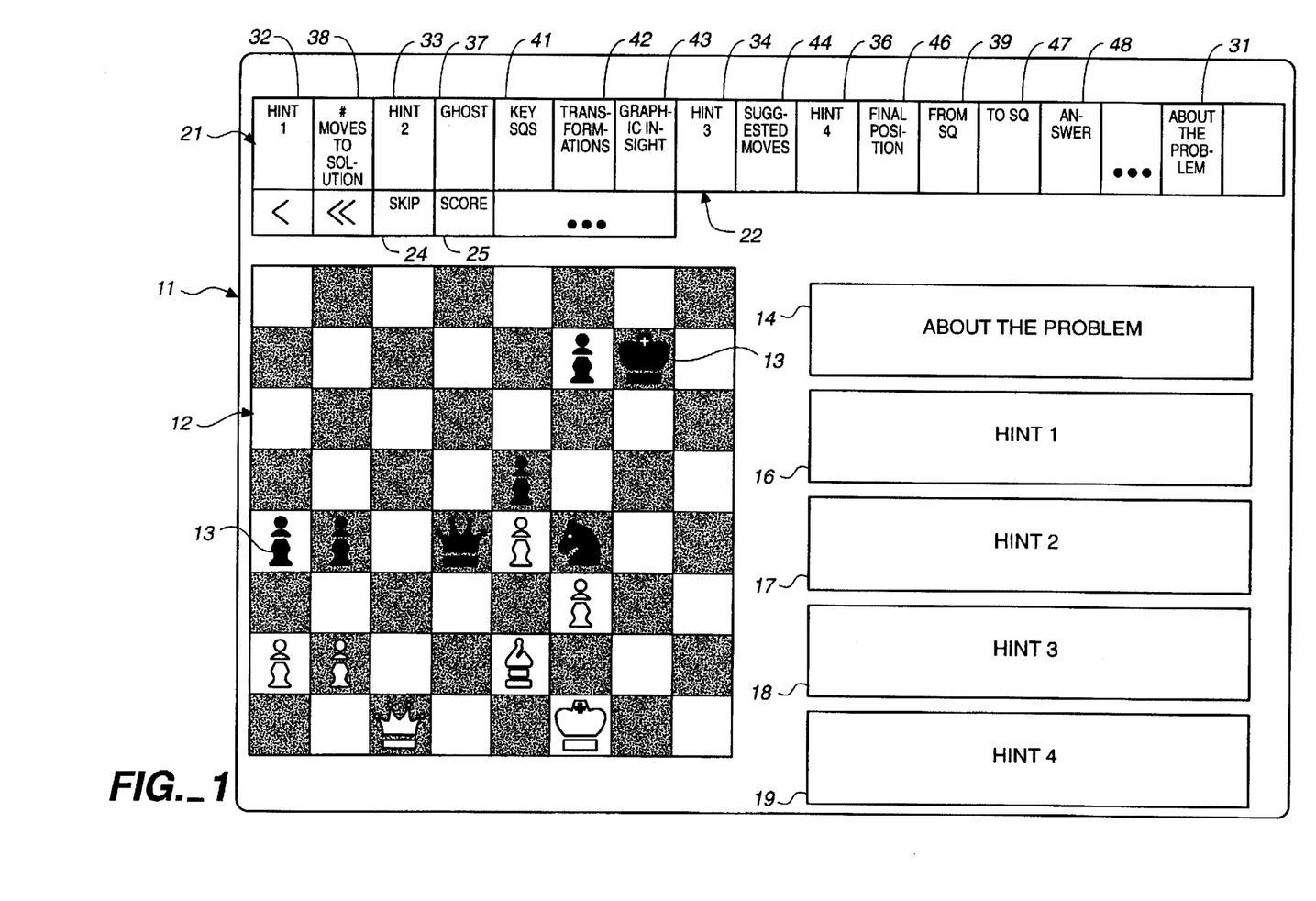
FIG. 1 is a representation of a computer screen illustrating the various elements of the present invention in connection with the game of chess.

Referring to FIG. 1, a computer screen 11 simulates a chessboard 12 (a portion of the board may be adequate for some problems) on which are arranged a number of chess pieces 13 in a configuration establishing a problem to be solved. The goal of the problem, as well as any other information that might be of interest can be stated in a text box 14 (which can overlay other text boxes when selected). A plurality of hint text boxes 16, 17, 18, and 19 are presented on the computer screen along with the equipment simulation.

The problem presented is solved by one or more predetermined steps achieved by sequentially moving one or more of the pieces 13 according to the rules of chess (solution set). If the problem calls for the player to move the white pieces then the computer operates the black pieces and vice versa. The most convenient way for moving a piece 13 is to drag it from one square to the square that the player believes is the next sequential move in solving the problem. The use of a mouse for dragging items on a screen is well known in the art and while this is a convenient way of moving pieces of a game of this sort, it is well within the art to use other methods including a keyboard.

If the player moves the selected piece to a predetermined correct location for the solution of the problem, the piece will stay at the new location to which it has been moved (will be fixed at that location on the screen 11). If, however, an attempt is made to make other than a predetermined move, the piece moved will automatically return to its originating square (will not be fixed at that location on the screen 11) indicating to the player that a correct move was not selected. Other ways of alerting the player that an incorrect move has been attempted are to generate a sound or flash a message on the screen.

At any time during the attempted solution of the problem, the player can receive a hint by selecting one of the hint text boxes 16, 17, 18, or 19. Prompting the computer to reveal the contents of one of these hint text boxes results in either a graphic or textual hint being presented in that text box. The hints in the text boxes can contain varying amounts of information for the solution of the problem so as to be progressively more revealing such that selection of the hint in text box 19, for example, will be more helpful in solving the problem than any of the other hints. The hint in text box 18 will be more revealing than the hints in text boxes 16 and 17, etc. The player is at liberty to choose any one of the text boxes 16-19 at any time to obtain a hint and is not required to proceed in any order. Thus, while the hints have a hierarchy ranging from general to specific, they may be selected in any order desired by the player. The score for solving a problem can be dependent not only on the number of hints used but the information content of the hints as well.

When the problem to be solved requires more than one sequential move of the chess pieces, the hints available from all or some of the hint text boxes 16-19 will likely change with each successive correct step taken towards the solution of the problem. Thus, by way of example, selection of the hint text box 16 will bring forward certain information for solving the problem when all the pieces are in their original squares, but bring forward different hint information when selected after one or more successful moves towards the solution have been made. In this way, the available hints to the player are always appropriate for the configuration of the pieces as they exist at the time that the hint is called for and relate to the moves yet to be made to solve the problem.

It is a feature of the invention that a series of related problems be stored in the computer and presented to the player in order to achieve a proficiency in a particular aspect of the game of chess. In order to acquire this proficiency, it is useful if the problems are presented in an order which takes into account the skill and mastery of the player at the time.

During the solution of a problem, a player will take a certain amount of time to solve the problem and a player may also attempt one or more incorrect moves and may select one or more of the available hints. A score can be ascribed to the solution of any problem as a function of one or more of the following factors: (1) the number of incorrect moves attempted, (2) the number of hints selected, (3) the level (information content) of the hints selected, (4) the time taken to solve the problem, and (5) the number of related problems previously solved and their scores. Using one or any combination of these five factors or other factors, the computer maintains a scoring history for a given player and based on that scoring history, selects new problems to be solved by that player which are most appropriate for the player's demonstrated skill level. The more that the system of the present invention is used by a player, the more the computer knows about the user, and, thus, the more it can tailor the teaching to the capability of that player.

Thus, for teaching the game of chess the device of the present invention includes the steps of: presenting on a portion of a computer screen a simulation of all or a portion of a chessboard together with representations of chess pieces arranged on the board to present a problem having a solution achieved by one or more predetermined steps achieved by a predetermined move or sequence of moves of one or more of the chess pieces one or more times to one or more different locations on the board as permitted by the rules of chess; automatically returning any moved piece to its originating position on the board unless it is a predetermined next move; storing in the computer memory a plurality of selectable hints for making a predetermined correct next move for the configuration of pieces on the screen wherein the hints are of varying specificity; and, optionally selecting a stored hint and revealing it on the computer screen. In addition, the solution of a problem can be scored as a function of the time taken to solve the problem, the number of incorrect moves (moves other than predetermined moves), and the number and/or specificity of hints selected during the solution of the problem. The computer stores a plurality of problems of varying difficulty. The scores achieved by the player are stored in the computer and used in selecting the next problem to be presented to the player.

In addition to the representation of a chessboard 12, chess pieces 13 and the hint boxes 16, 17, 18, and 19 in the preferred embodiment, the computer screen also presents a "tool bar" 21 comprised of a plurality of separate "tools" 22 each represented by a graphical or textual icon. The tool bar 21 and its tools 22 provide a convenient way to prompt the computer to initiate computer subroutines that provide different kinds of hints or suggestions upon request.

Those features of the present invention previously described, as well as others which further enhance the teaching method of the invention are best revealed and described in connection with a step by step solution of a problem utilizing various method steps of the invention. For this purpose, reference is made to FIGS. 1–6, sequentially.

Referring to FIG. 1, chess pieces 13 are arranged in a configuration that presents a problem to be solved. If the player does not immediately recognize the problem to be solved or the solution to the problem, a number of choices exist for obtaining further information to assist in better understanding the problem and its solution.

Figure 2:
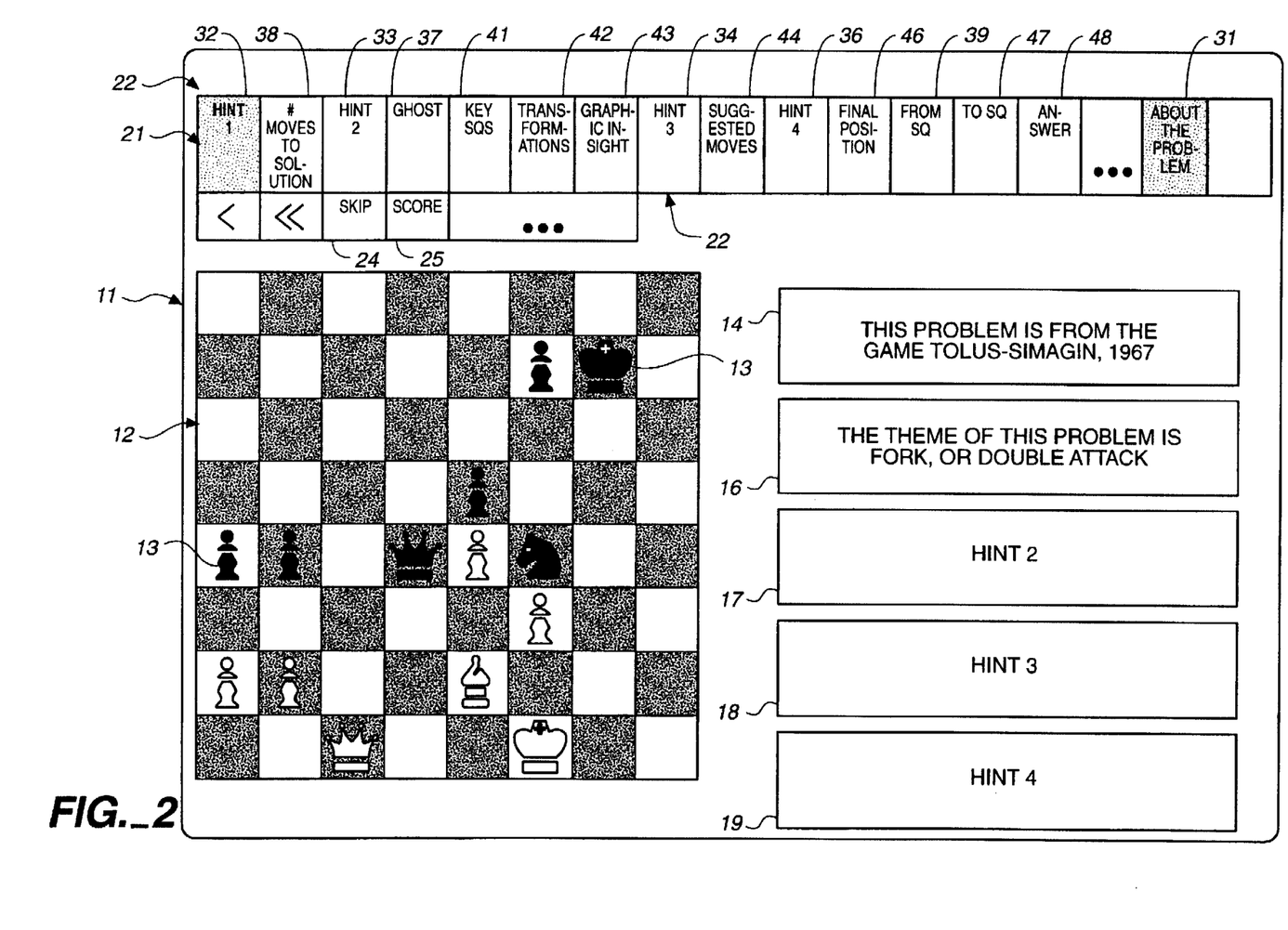
FIG. 2 is the same as FIG. 1 with certain designated portions of the screen activated.

Referring to FIG. 2, the pieces 13 remain in their original locations as shown in FIG. 1, but the text boxes 14 and 16 have been activated to bring forth information about the problem and a hint (multiple hints can be on the screen at the same time). The text box 14 can be activated by either selecting (clicking a mouse when the cursor is on the screen area to be selected) the box itself or selecting tool 31 "About the Problem". Similarly, the computer can be prompted to reveal the hint in text box 16, 17, 18, or 19 by either selecting the box itself or selecting tool 32, 33, 34, or 36, respectively. Selecting a hint 14–19 or a tool 22 can be accomplished, as is well known in the art, by using a mouse to position a curser over the screen area representing the desired hint or suggestion (such selectable areas are frequently referred to as "buttons") and "clicking" the mouse.

Figure 3:
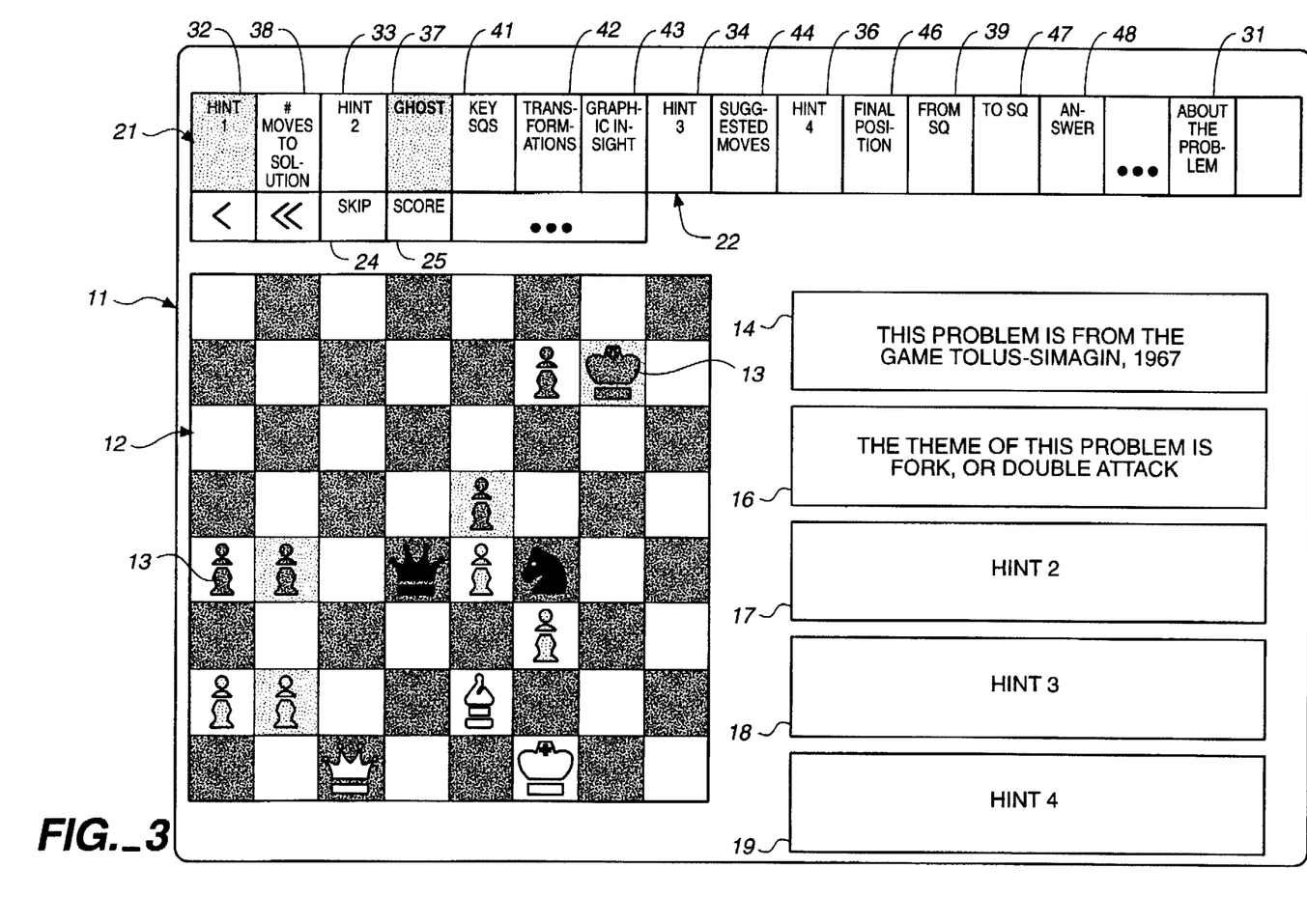
FIG. 3 is the same as FIG. 1 with other portions of the screen activated.

Referring to FIG. 3, the chess pieces 13 continue to remain in their original locations. If the player remains unsure of the next move and desires further information for making that move, the "Ghost" tool 37 can be selected from the tool bar 21 which will prompt the computer to identify certain of the chess pieces 13 (such as by dimming the others) as the pieces involved in the solution of the problem. The particular way of identifying the chess pieces involved in solving the problem is a matter of choice, and in addition to dimming the non-essential pieces, pieces could be identified by color or size, etc. Uses of the "Ghost" feature can be taken into account in ascribing a solution score.

Figure 4:
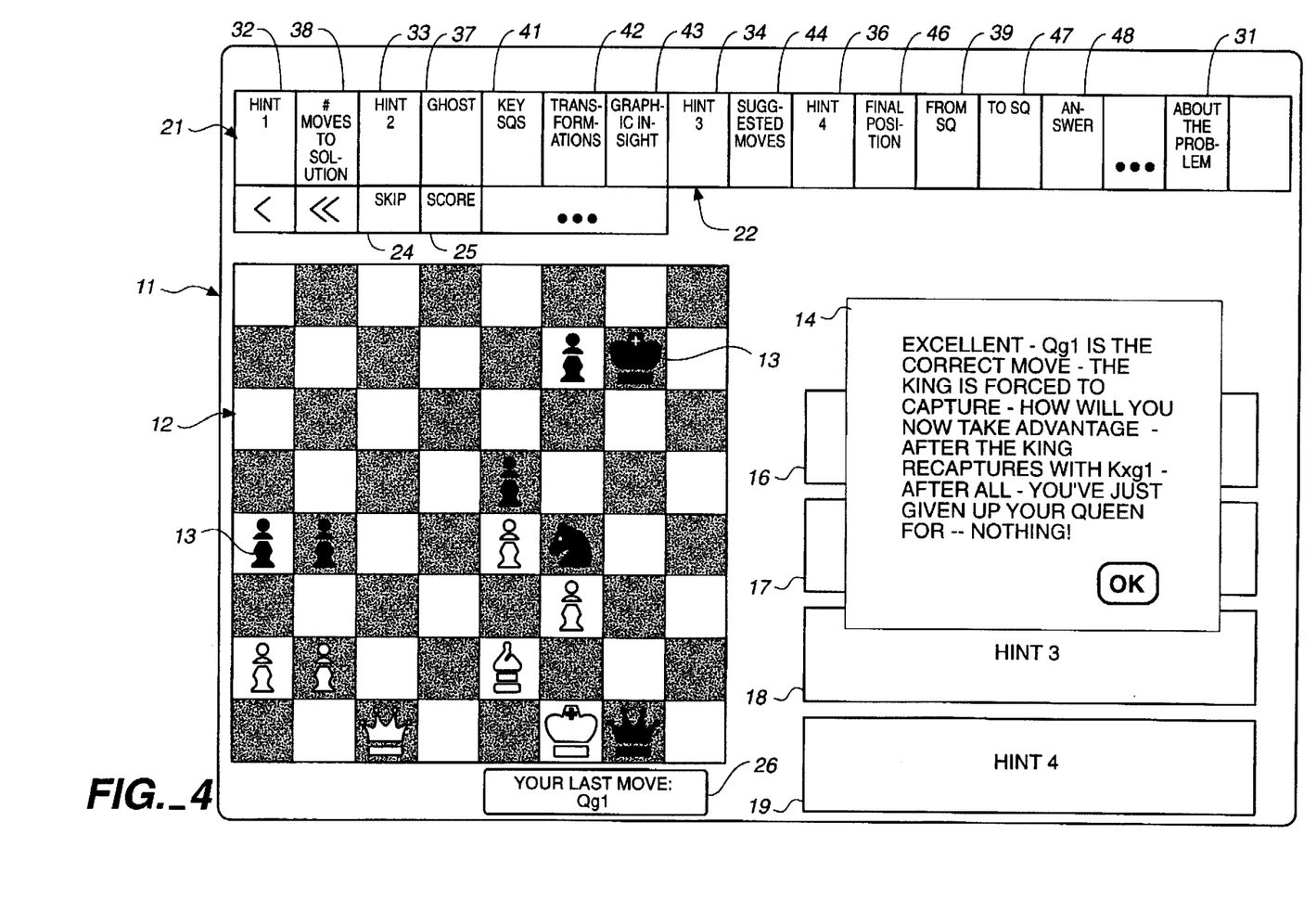
FIG. 4 is the same as FIG. 1 with one of the chess pieces moved to a new location.

Referring to FIG. 4, one of the chess pieces (in particular the black queen) is shown moved to a new location. Because it is a feature of the present invention that movement of any pieces other than predetermined pieces to any squares other than predetermined squares results in the piece being automatically returned to its originating position (not fixed on the screen at the attempted location), the player knows immediately that a correct piece has been selected and a correct move made when the piece remains (is fixed on the screen) in its new location. In addition, text is presented in the text box 14 acknowledging that a correct move was made along with other comments.

Figure 5:
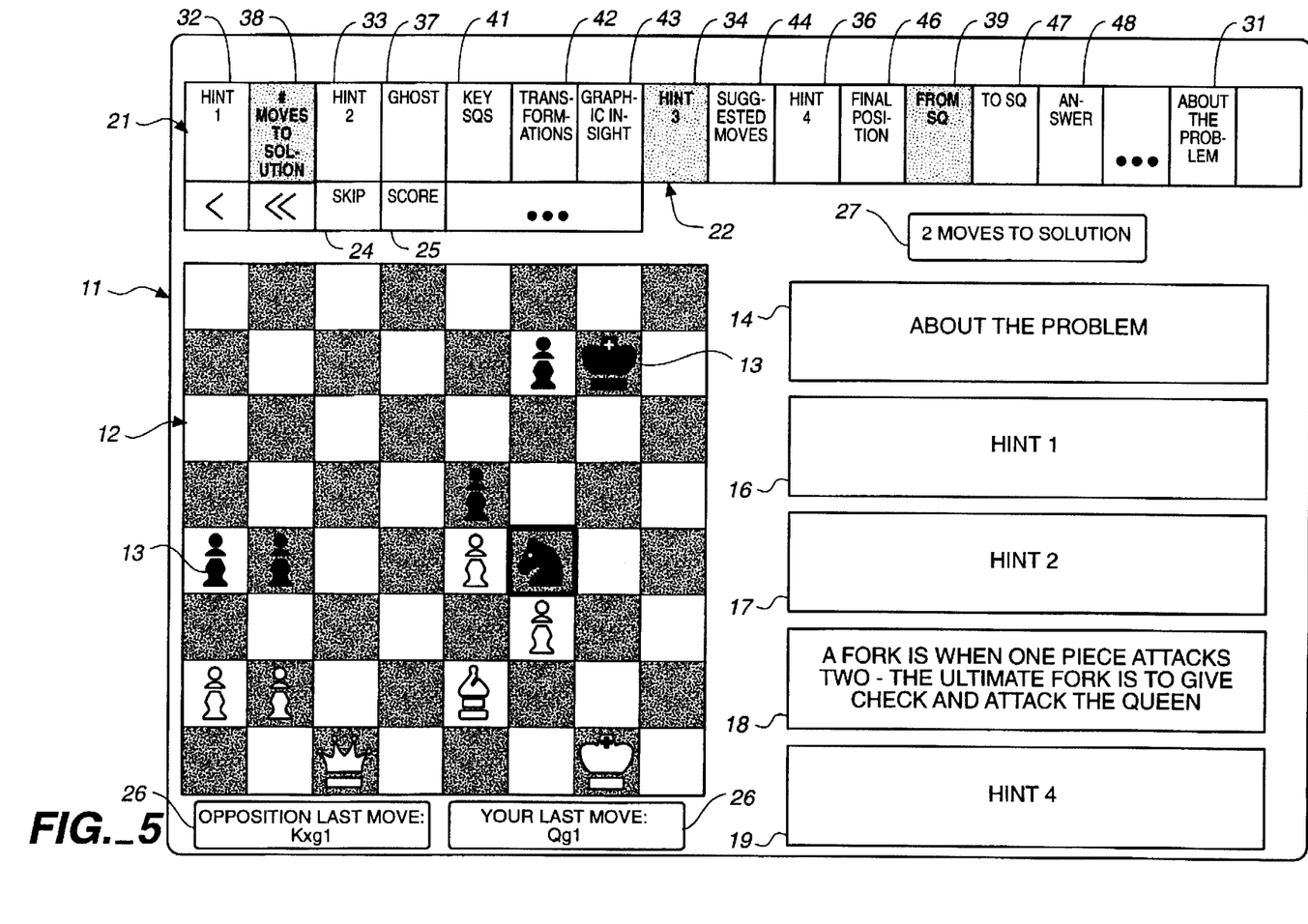
FIG. 5 is the same as FIG. 1 with the chess pieces moved to new locations and certain features of the invention shown activated.

Referring to FIG. 5, to discover how many moves remain to achieve the solution, tool 38, "Number of Moves to Solution" in the tool bar 21 is selected producing the text 27. Further, the piece to be moved for the next correct step in the solution is revealed (highlighted) as a result of selecting the "From Square" tool 39 in the tool bar 21 and further, an additional hint in text box 18 has been revealed as a result of selecting "Hint 3" tool 34, (or selecting the text box 18 itself).

The movement of the black queen to its new location automatically resulted in the computer having the white king capture the black queen as one of the predetermined moves in the sequence leading to the solution of the problem. For convenience, the last moves of both the opponent (computer) and the player are listed in a "Last Move" text box 26 below the chessboard 12.

Figure 6:
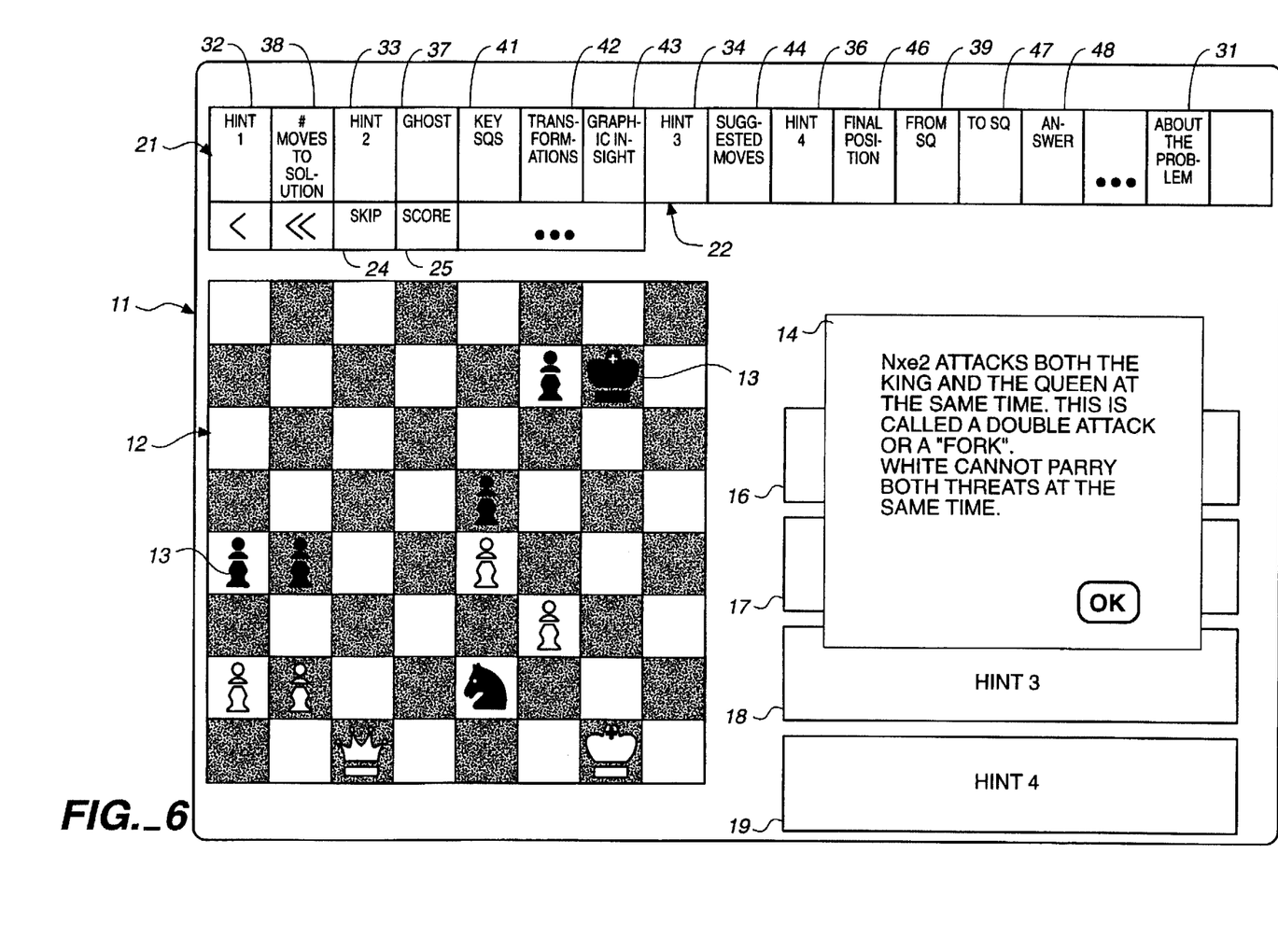
FIG. 6 is the same as FIG. 5 with the chess pieces shown in a new location.

Referring to FIG. 6, the black knight has been moved to capture the white bishop (which the computer acknowledges as a correct move by permitting the black knight to remain fixed in its new location) and text in the text box 14 gives an explanation of the position.

Figure 7:
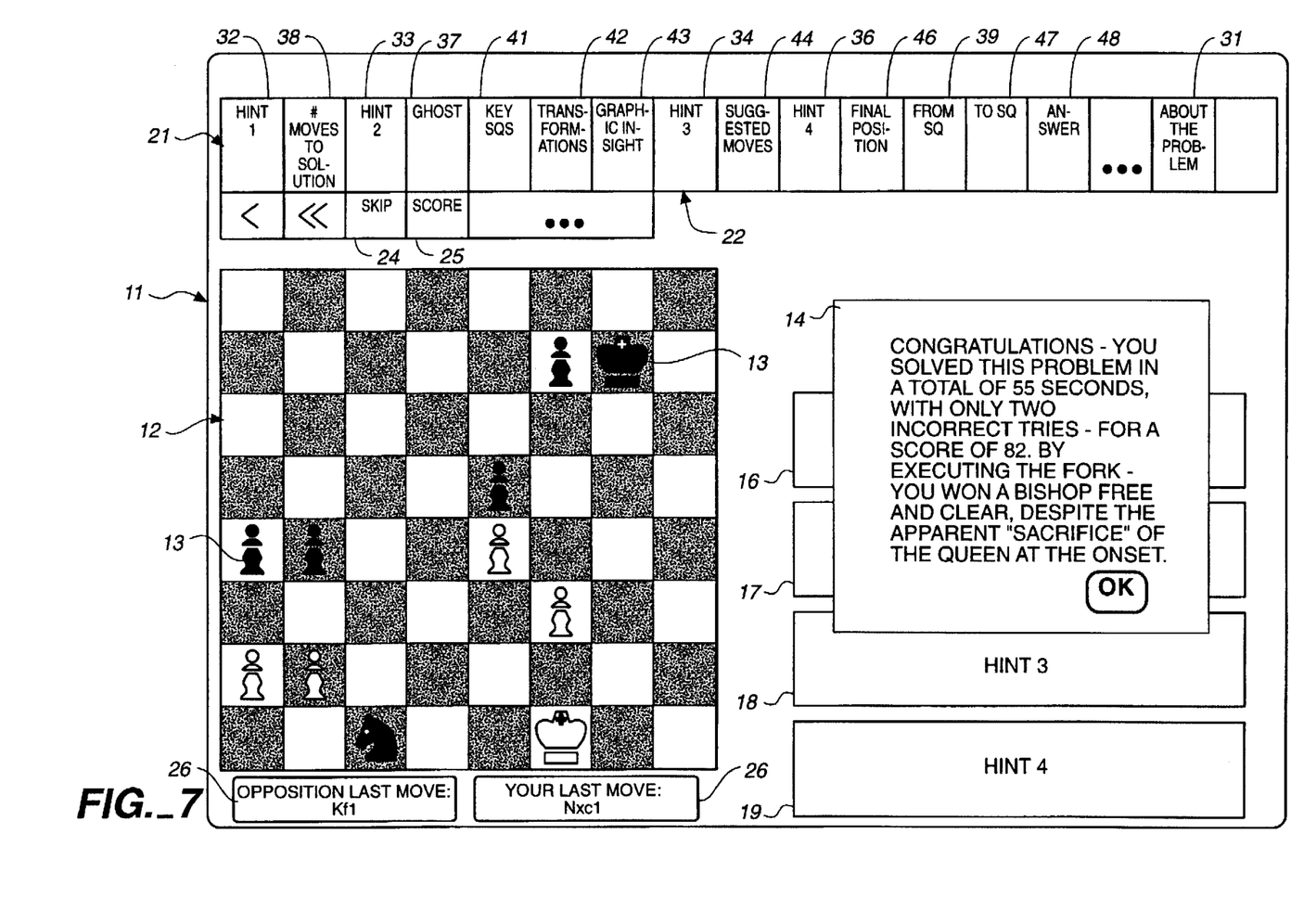
FIG. 7 is the same as FIG. 6 with the chess pieces once again shown in a new location.

Referring to FIG. 7, after the computer was forced to move the white king out of check, the black knight captured the white queen which is the predetermined final and correct move in solving the problem. Once again, text appears at 14 commenting on the position.

The foregoing example reveals some of the tools available to the player during the solution to a problem such as the use of the "Ghost" tool 37, the "Hints" tools 32, 33, 34, and 36, the "Number of Moves to Solution" tool 38, and information about the problem. There are additional tools 22 in the tool bar 21 that could also have been used.

These additional tools 22 include the "Key Squares" tool 41 which when selected prompts the computer to highlight the squares which are involved in solving the problem; the "Transforming Pieces" tool 42 which when selected prompts the computer to outline (or otherwise identify) all chessboard 12 squares that contain pieces only available when the final solution to the problem is a few moves from being achieved); the "Graphic Insight" tool 43 which graphically characterizes key pieces in the position. When a graphic insight piece is double selected (double clicked with a mouse), a help text box pops up on the screen (not shown) which explains in text the meaning and intent of its graphic. The "Suggested Moves" tool 44, when selected, brings up a list of moves which the user might try, including a correct move with several "decoys". Selecting the move from the list makes the move on the board momentarily. To actually make a suggested move, the user must physically move the piece on the board in the normal manner. The "Final Position" tool 46, when selected results in the final position of the pieces on the chessboard representing the solution. Once again, this tool is best available when the solution to the problem is only a few moves away. The "To Square" tool 47 when selected, highlights the next square to which one of the pieces must be moved. The "Answer" tool 48, when selected highlights both the square of the piece to be moved and its destination square. The foregoing demonstrates how the invention provides a variety of different kinds of hints and suggestions on demand.

In addition to the tool bar 21, the computer screen also presents a navigation bar 23 having a plurality of navigation tools represented by graphic or textual icons. When the "Skip" navigation tool 24 is selected, the current problem is withdrawn and a new problem is presented. The "Score" navigation tool 25 brings up the player's score for the last completed problem. In addition, the graphical icon tools permit the problems to be reset one step or to the very beginning of the problem.

In the preferred embodiment of the invention the problems stored in the computer would be in sets. Each set of problems would end with the same steps but approach those steps from progressively more remote positions. For example, the first chess problem of a set could be solved by step "a" followed by step "b". The second problem presented from the set would require a step "c" (or possibly "c" and "d") to get the pieces to where they were in the first problem and again requiring step "a" followed by step "b" to solve the problem. The third problem could require a step "e" to get the pieces to the arrangement of the second problem, requiring steps "c", "d","a" and "b" to solve the problem. By presenting the problems in these sets, the player gets a larger and larger view of the game while repeatedly practicing fundamental moves.

Thus, the present invention advantageously includes the steps of storing in the computer for selective presentation on the computer screen a set of problems solved by sequential manipulation of game equipment wherein the stored problems are related in that in their solution they all include among the steps required to solve the problem a common sequence of steps.

The present invention, while particularly suited to the game of chess, is not uniquely so and, in fact, just about any game that includes game equipment which is sequentially moved during the play of the game is adaptable to the method of the present invention. By way of example, if the game simulated is bridge, there would be presented in the location where the chess game presents the board and pieces four sets of bridge playing cards representing the cards remaining to be played in a hand of bridge. The problem solution might require one or more cards to be played with the declarer playing the cards assigned to that position as well as the dummy cards and the computer playing the defender's cards. The information box 14 and the hint boxes 16–19 function in the same way as described above in connection with the game of chess as would most of the tools 22 in the tool bar 21. The tools 22 might be differently labeled or use different graphical icons but their functions would remain largely the same. As in connection with chess, any attempt to play a card other than one of the predetermined correct cards would result in the card immediately returning to its original position indicating to the player that an incorrect move was attempted.

The adaptation of the method of the present invention to such games as Checkers, Go, Backgammon and even Scrabble are obvious and require no further explanation. In all of the games, the computer presents a simulation of all or a part of the game equipment in a condition posing a problem to be solved. The solution of the problem is achieved by sequential manipulation of the simulated game equipment assisted by hints and information selected by the player as desired. Each problem upon completion is scored and that score is retained in the computer whereby the computer gauges the ability of the player and presents new problems most appropriate for the player's demonstrated skill level.

All of the computer functions described in connection with the present invention are well within the skill of those versed in the art of computer programming and do not of themselves form any part of the invention. Other adaptations and modifications of the invention are possible and thus the scope of the invention is not to be limited by the specific examples presented herewith, but are rather to be limited only by the scope of the claims that follow.

We claim:

1. A computer readable memory operable with a computer having a display screen to cause the computer to function as follows:

store a plurality of problems that can be displayed one at a time on the screen in the form of arrangements of problem representations, wherein said problems are solved by a solution set of sequential rearrangements of the problem representations where the number of said rearrangements in said solution set required to solve a said problem is two or more;

store for each said problem one correct solution set of predetermined sequential rearrangements of the problem representations that solves that problem;

store a plurality of different kinds of hints for each said problem;

display on the computer screen a plurality of selectable hint buttons wherein each said hint button is associated with a hint of a particular kind;

display one of said stored problems to be solved on the computer screen;

fix on the screen a display of said problem representations in their rearranged positions in response to an attempted rearrangement of the problem representations on the screen which corresponds to the predetermined sequential rearrangement in the solution set for said problem displayed;

fix on the screen a display of that arrangement of said problem representations which was displayed on the screen immediately prior to an attempted rearrangement in response to an attempted rearrangement of said problem representations on the screen which is not a predetermined sequential rearrangement in the solution set for said problem displayed;

display on the screen in response to selection of one of said hint buttons a hint of the particular kind with which said button is associated;

display on the screen, for each different arrangement of said problem representations fixed on the screen, in response to selection of a hint button, a stored hint specific to the arrangement of said problem representations fixed on the screen at the time the hint button is selected; and change the content of two or more of said hints available whenever the arrangement of said problem representations fixed on the screen changes.

2. The memory of claim 1 wherein the computer is further caused to operate as follows:

display simultaneously on the screen a multiplicity of said hints in response to selection of a multiplicity of said hint buttons.

3. The memory of claim 1 wherein the computer is further caused to operate as follows:

change the content of at least three of said hints available whenever the arrangement of said problem representations fixed on the screen changes.

4. The memory of claim 3 wherein the number of said hints selectable for any given arrangement of said problem representations fixed on the screen is more than three.

5. The memory of claim 4 wherein the computer is further caused to:

ascribed a hierarchy of values to said stored hints.

6. The memory of claim 5 wherein the computer is further caused to:

ascribe and record a solution value to each said problem solved wherein the solution value so ascribed and recorded is a function of the number and value of said hints used during the solution of said problem.

7. The memory of claim 6 wherein the computer is further caused to:

select a said problem for display on the screen from said plurality of problems stored in the computer as a function of the solution values ascribed to one or more of said problems previously displayed and solved.

8. The memory of claim 3 wherein the computer is further caused to:

continue to display on the screen that arrangement of said problem representations fixed on the screen at the time one or more of said hint buttons are selected to display a hint whereby said hints and the position of the said problem representations are visible on the screen at the same time.

9. The memory of claim 8 wherein the computer is further caused to:

maintain freed, and not extinguish, the hints displayed on the screen in response to an attempted rearrangement of said problem representations on the screen.

10. The memory of claim 1 wherein the computer is further caused to:

after an attempted rearrangement of said problem representations which attempted rearrangement is not part of said solution set, following a prior rearrangement which is one of said solution set, fix the screen display with the arrangement of said problem representations immediately prior to the attempted rearrangement and immediately after the prior rearrangement of said problem representations and not return the screen display to the arrangement of said problem representations fixed on the screen at the beginning of the problem.

11. The memory of claim 1 wherein the computer is further caused to:

indicate on the screen, in response to selection of one of said hint buttons, one or more of said problem representations on the screen involved in the next arrangement of said problem representations in said solution set for said problem displayed.

12. The memory of claim 1 wherein the computer is further caused to;

display on the screen, in response to selection of one of said hint buttons, the number of rearrangements remaining in said solution set for solving said problem displayed.

13. The memory of claim 1 wherein the computer is further caused to:

display on the screen, in response to selection of one of said hint buttons, a plurality of possible rearrangements of said problem representations including one from said solution set for said problem displayed.

14. The memory of claim 1 wherein said problems are chess problems and said problem representations include all or a portion of a chess board and chess pieces.

15. The memory of claim 1 wherein said problems are Go problems and said problem representations include all or a portion of a go board and go pieces.

16. The memory of claim 1 wherein said problems are Bridge problems and said representations include all or a portion of a deck of bridge playing cards.

17. The memory of claim 1 wherein said problems are Backgammon problems and said representations include all or a portion of a backgammon board and backgammon markers.

18. The memory of claim 1 wherein said problems are Checkers problems and the representations include all or a portion of a checkers board and checkers pieces.

19. The memory of claim 1 wherein said problems are Scrabble problems and said representations include all or a portion of a scrabble board and scrabble pieces.

20. The memory of claim 1 wherein the computer is caused to:

display on the screen, in response to selection of a first one of said hint buttons, a plurality of possible rearrangements of said problem representations including one from said solution set for said problem displayed;

display on the screen, in response to selection of a second one of said hint buttons, the number of rearrangements remaining in said solution set for solving said problem displayed.

indicate on the screen, in response to selection of a third one of said hint buttons, one or more of said problem representations on the screen involved in the next arrangement of said problem representations in said solution set for said problem displayed;

display on the screen, in response to selection of a fourth one of said hint buttons, the solution to the problem displayed.

21. A computer readable memory operable with a computer having a display screen to cause the computer to function as follows:

store a plurality of chess problems that can be displayed one at a time on the screen in the form of arrangements of chess equipment representations, wherein said problems are solved by a solution set of sequential rearrangements of the problem representations where the number of said rearrangements in said solution set required to solve a said problem is two or more;

store for each said problem one correct solution set of predetermined sequential rearrangements of the chess equipment representations that solves that said problem;

store a plurality of different kinds of hints for each said problem;

display on the computer screen a plurality of selectable hint buttons wherein each said button is associated with a hint of a particular kind;

display one of said stored problems to be solved on the computer screen;

fix on the screen a display of said chess equipment representations in their rearranged positions in response to an attempted rearrangement of said chess equipment representations on the screen which corresponds to the predetermined sequential rearrangement in the solution set for said problem displayed;

fix on the screen a display of that arrangement of said chess equipment representations which was displayed on the screen immediately prior to an attempted rearrangement in response to an attempted rearrangement of said chess equipment representations on the screen which is not a predetermined sequential rearrangement in the solution set for said problem displayed;

display on the screen in response to selection of a hint button a hint of the particular kind with which said button is associated;

display on the screen, for each different arrangement of said chess equipment representations fixed on the screen, in response to selection of a hint button, a stored hint specific to the arrangement of said chess equipment representations fixed on the screen at the time the hint button is selected; and change, whenever the arrangement of said chess equipment representations fixed on the screen changes, the content of two or more of said hints available.

22. The memory of claim 21 wherein the computer is further caused to operate as follows:

display simultaneously on the screen multiple hints in response to selection of multiple said hint buttons.

23. The memory of claim 21 wherein the computer is further caused to operate as follows:

change the content of at least three said hints available whenever the arrangement of chess equipment representations fixed on the screen changes.

24. The memory of claim 23 wherein the number of available hints selectable for any given arrangement of chess equipment representations is more than three.

25. The memory of claim 24 wherein the computer is further caused to:

ascribed a hierarchy of values to said stored hints.

26. The memory of claim 25 wherein the computer is further caused to:

ascribe and record a solution value to each said problem solved wherein the solution value so ascribed and recorded is a function of the number and value of said hints used during the solution of the problem.

27. The memory of claim 26 wherein the computer is further caused to:

select a problem for display on the screen from the plurality of said problems stored in the computer as a function of the solution values ascribed to one or more of said problems previously presented and solved.

28. The memory of claim 23 wherein the computer is further caused to:

continue to display on the screen that arrangement of chess equipment representations fixed on the screen at the time one or more said hint buttons are selected to display a hint whereby said hints and the position of the chess equipment representations are visible on the screen at the same time.

29. The memory of claim 28 wherein the computer is further caused to:

maintain fixed, and not extinguish, said hints displayed on the screen in response to a rearrangement of said chess equipment representations on the screen.

30. The memory of claim 21 wherein the computer is further caused to:

after an attempted rearrangement of said chess equipment representations which attempted rearrangement is not part of said solution set, following a prior rearrangement which is one of said solution set, fix the screen display with the arrangement of said chess equipment representations immediately prior to the attempted rearrangement and immediately after the prior rearrangement of chess equipment representations and not return the screen display to the arrangement of said chess equipment representations fixed on the screen at the beginning of said problem displayed.

31. The memory of claim 21 wherein the computer is further caused to:

indicate on the screen, in response to selection of a one of said hint buttons, one or more of said chess equipment representations on the screen involved in the next arrangement of said chess equipment representations in said solution set for said problem displayed.

32. The memory of claim 21 wherein the computer is further caused to:

display on the screen, in response to selection of one of said hint buttons, the number of rearrangements remaining In said solution set for solving said problem displayed.

33. The memory of claim 21 wherein the computer is further caused to:

display on the screen, in response to selection of one of said hint buttons, a plurality of possible rearrangements of said chess equipment representations including one from said solution set for said problem displayed.

34. The memory of claim 21 wherein the computer is caused to:

display on the screen, in response to selection of a first one of said hint buttons, a plurality of possible rearrangements of said chess equipment representations including one from said solution set for said problem displayed;

display on the screen, in response to selection of a second one of said hint buttons, the number of rearrangements of chess equipment representations remaining in said solution set for solving said problem displayed.

indicate on the screen, in response to selection of a third one of said hint buttons, one or more of said chess equipment representations on the screen involved in the next arrangement of said problem representations in said solution set for said problem displayed;

display on the screen, in response to selection of a fourth one of said hint buttons, the solution to said problem displayed.

* * * * *

UNITED STATES PATENT AND TRADEMARK OFFICE
CERTIFICATE OF CORRECTION

PATENT NO. : 5,678,001
DATED : October 14, 1997
INVENTOR(S) : Ralph Nagel and Roger Roberts It is certified that error appears in the above-indentified patent and that said Letters Patent is hereby corrected as shown below:

Column 8, Line 40, Claim 9, the word "freed" should read -- fixed --.

Column 5, line 60, after "pieces" should read--which move or are captured in the solution to the problem (this tool is--.

Signed and Sealed this

Twenty-seventh Day of January, 1998

Attest:

BRUCE LEHMAN

Attesting Officer

Commissioner of Patents and Trademarks